E. P. SOMMERS.
STARTER FOR INTERNAL COMBUSTION ENGINES.
APPLICATION FILED MAY 14, 1918.

1,307,026.

Patented June 17, 1919.

INVENTOR.
EDWARD P. SOMMERS,
BY
Mack & Litzenberg
ATTORNEY.

UNITED STATES PATENT OFFICE.

EDWARD P. SOMMERS, OF LOS ANGELES, CALIFORNIA.

STARTER FOR INTERNAL-COMBUSTION ENGINES.

1,307,026.

Specification of Letters Patent.  Patented June 17, 1919.

Application filed May 14, 1918.  Serial No. 234,793.

*To all whom it may concern:*

Be it known that I, EDWARD P. SOMMERS, a citizen of the United States, and a resident of Los Angeles, in the county of Los Angeles and State of California, have invented new and useful Improvements in Starters for Internal-Combustion Engines, of which the following is a specification.

My invention relates to means capable of being applied to internal combustion engines of the type used for propelling automobiles, or stationary engines, and is adapted to be manually operated by means of hand or foot pressure, the main objects of my invention being to provide a simplified form of starting device, means whereby said device may be readily attached to common types of pleasure and commercial vehicles, without altering the same, which in the case of small vehicles may be provided at a small cost, and which will be economical in operation and maintenance.

A further object is to provide a starting device especially adapted for use on light pleasure vehicles embodying friction means applicable to the crank shaft of the engine which, when operated by the hand or foot pressure, may turn the crank shaft at least a quarter of a revolution at each operation and thus start the engine.

A further object is to provide a combined pulley for operating the fan belt usually provided on such automobiles, a clutch for connection with the hand operated crank also usually provided therefor, and a friction wheel integrally formed and attached to the outer end of the crank shaft, a friction band of the character generally used with friction brakes being provided for the friction wheel, and means being provided for holding the wheel and band in alinement at all times.

A further object is to provide an integral driving and friction element on the outer end of the crank shaft and a friction band therearound composed of two hinged segments, the hinge or joint therebetween being preferably at a point diametrically opposite the cam for contracting the band, thus rendering the action of the band more uniform than otherwise, and providing a more equal distribution of the friction exerted upon the wheel.

A still further object is to provide in such a starting mechanism, means for tightening the band around the friction wheel, means for restoring the parts to normal positions after each operation, and means whereby when a box-fire occurs during the starting operation, the friction band may be automatically released from the wheel. Other objects may appear in the hereinafter following detailed description.

I have shown a preferred embodiment of my invention in the accompanying drawing forming a part of this application, in which similar characters of reference are employed for indicating the same or like parts throughout the several views and in which, Figure 1 is a front elevation of my improved device showing the crank case of the engine in section taken on the line 1—1 of Fig. 2;

Figure 2:
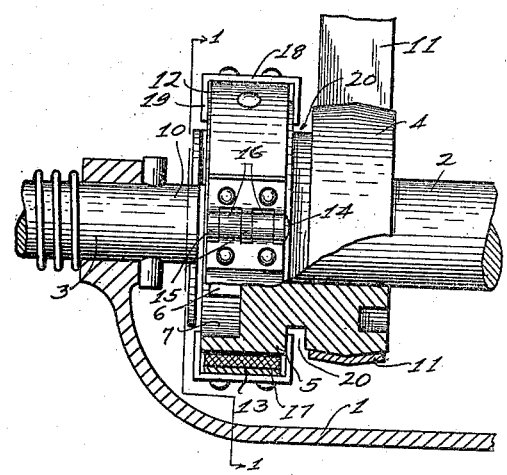
Fig. 2 is a side elevation of the same, partly in section.
Figure 3:
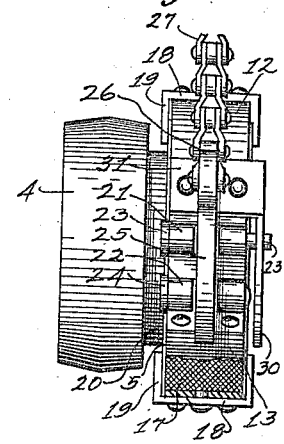
Fig. 3 is a reverse side elevation of a portion of the mechanism shown in Fig. 2 and also partly in section.
Figure 1:
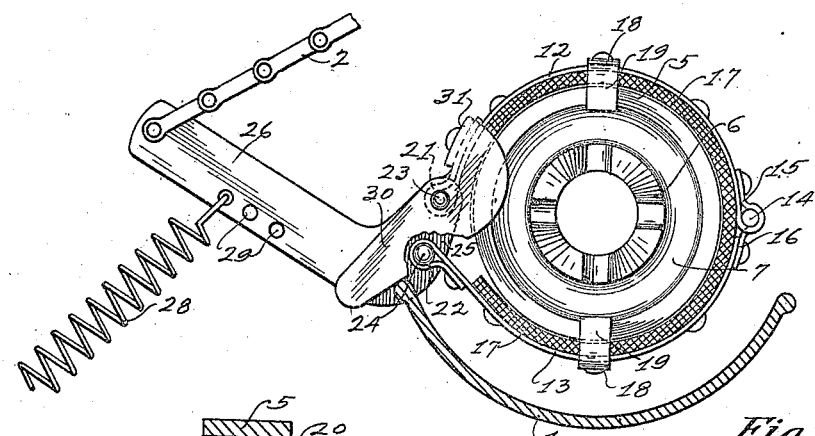
Figure 4:
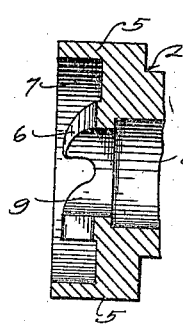
Fig. 4 is an enlarged longitudinal section of a portion of the integrally formed clutch, friction and driving element.

In the drawings, 1 represents the crank case of a well known type of automobile engine, 2 indicates the crank shaft of the engine and 3, the starting crank. In lieu of the usual fan belt pulley of the engine, I provide, as hereinbefore stated, an integrally formed element comprising a pulley 4, a friction wheel 5, and a spiral clutch member 6, the friction wheel 5 being provided with a recess 7, in which the clutch member 6 is formed. The pulley 4 is bored at 8, to receive and is adapted to be suitably keyed or otherwise secured to the crank shaft 2 of the engine, and the friction wheel 5 has a bore 9, to receive the inner end 10 of the starting crank 3, the bores 8 and 9 being concentrically formed. It will be apparent that in such a structure, the pulley 4 will rotate with the crank shaft 2, and motion may thus be communicated from the crank shaft to the fan, not shown, by means of a belt 11.

A friction band composed of a pair of metallic members 12 and 13 hinged together at their ends by means of a pin 14 extending through suitable loops or bends 15 and 16, is provided for attachment to the friction wheel 5, and each of the metallic band members is suitably attached to a composition band 17 of fire proof and non-burning qualities, such as is generally used in brake bands for automobiles. The friction band is held in position on the wheel 5 by means of retainers 18, riveted or otherwise suitably attached to the outer peripheries of the members 12 and 13, and these retainers have right angularly bent ends 19, which extend inwardly over the edges of the wheel 5, the rear portion of the wheel being provided with an annular groove 20, to receive the ends of the retainers, as shown.

The ends of the band members 12 and 13, which when in proper position on the wheel 5, are substantially opposite the hinged ends thereof, are bent or looped at 21 and 22, respectively, to receive pins 23 and 24, and are recessed so as to receive the cam 25 of the operating lever 26, and pins 23 and 24 being extended through the loops 21 and 22, and the cam end 25 of said lever, so that an upward movement of the lever will contract band members 12 and 13 and thus exert friction upon the wheel 5.

The lever 26 may be connected by means of a chain 27, or by other suitable means, at its outer end, with the forward portion of the automobile body at a point convenient to the driver, so that the band may be contracted from the interior of the car, and a spring may be attached to said lever and in one or the other of a plurality of perforations 29, formed therein for restoring and expanding the band after each operation, the lower end of spring 28, being adapted to be connected to a suitable portion of the running gear frame of the vehicle.

In order to prevent damage to the starting mechanism when a back-fire occurs in the starting operation, I provide an arm 30, which is bent flatwise at 31, and rigidly attached to the end of the upper band member 12 just above the end of the cam 25 of lever 26, the central portion of this arm being bored to receive the end of the pin 23 by means of which the lever is pivotally attached to the band member 12, and the lower extended end of the arm substantially overlapping the upper edge of the crank case 1. It will be understood that in the event of a back-fire from the engine during the starting operation, when the lever 26 is raised, the crank shaft 2 will rotate in an anti-clockwise direction, carrying the friction band with it until the extended end of the arm 30 engages the edge of the crank case, whereupon the band will be caused to contract and damage to the parts thus prevented.

In the general use and adaptation of friction bands as used for brakes on vehicles, a single continuous band is provided and the tension of the band must be overcome before the same may be contracted to a sufficient extent as to serve their purpose, but in my band as shown and described, by means of the hinge joint, it will be apparent that the operation of the lever 26 will tightly clamp the band members against the wheel 5, with but little effort on the part of the operator and the band may thus be made to normally clear the periphery of the wheel 5.

I conceive it to be possible to modify my invention within the limits of the appended claims, without materially enlarging the scope or departing from the spirit of my invention.

What I claim is:

1. In a starter for internal combustion engines having a rotatable element, a friction element surrounding said rotatable element, means for expanding and contracting said friction element at will, and means attached to said friction element whereby said element will be automatically expanded and released from said rotatable element when a back-fire occurs in the engine.

2. In a starter for engines, a rotatable element supported on the crank shaft of the engine, an expansible and contractible element surrounding and adapted for frictional engagement with said rotatable element, means for expanding and contracting said element at will, and means for automatically expanding and releasing said frictional element from said rotatable element when a back-fire occurs in the engine.

3. In a starter for engines, a rotatable element operable by the engine, and a relatively expansible and contractible element adapted for frictional engagement therewith for starting the engine, and means whereby when a back-fire occurs in the engine said expansible element will be automatically expanded for releasing the rotatable element.

4. In a starter for engines, a rotatable element, an expansible element for frictional engagement therewith, means for normally expanding said expansible element, means for contracting said element at will, and means for automatically contracting said element in the event of a back-fire in the engine, so as to prevent damage thereto.

5. In a starter of the character described, the combination with the crank shaft, of a pulley rotatable therewith, friction means for engagement with said pulley, means for normally disengaging said friction element from said pulley, means for engaging said element with said pulley at will, and supplementary means for disengaging said element when a back-fire occurs.

6. In a starter of the character described, the combination with the engine crank shaft having means connected therewith for starting the engine at will, and means for automatically disconnecting said starting means when a back-fire occurs in the engine.

7. In a starter for engines having coöperating frictional starting elements connected with the crank shaft, the crank case forming a bearing for said shaft, and means connected with said starting means and adapted to engage said crank case when a back fire occurs in the engine, for releasing the starting means.

8. In a starter for internal combustion engines, a combined driving and friction element for rotation with the crank shaft of the engine, a jointed friction band around said friction element, means for expanding and contracting said band, and means whereby when a back-fire occurs, said band may be automatically expanded.

9. In a starter for internal combustion engines, in combination with the engine crank case shaft, a friction wheel on said shaft, a friction band therearound and having a pair of separable and jointed members, means for expanding and contracting said band, and means attached to said band and adapted to engage said crank case to prevent damage when a back-fire occurs.

10. In a starter for internal combustion engines, the combination of a friction wheel, a pair of hinged bands extended around said wheel, a common operating member for contracting and expanding said members, means attached to one of said members for preventing damage to the parts when a back-fire occurs, and means for preventing the lateral movement of said members on said wheel.

11. In a starter for internal combustion engines, the combination with the crank case and crank shaft, of an integrally formed belt pulley and friction wheel internally bored to receive said shaft, a jointed band around said wheel, operating means therefor, means for retaining said band on said wheel, and means attached to said band and adapted to engage said crank case for preventing damage to the parts when a back-fire occurs in the starting operation.

12. In a starter for internal combustion engines, the combination with the crank case and the crank shaft rotatably supported therein, of an integrally formed driving, friction and clutch member on said shaft, a jointed friction band having separable members extending around said friction element, means connected with and for expanding and contracting both of said members relative to said friction element, and means attached to one of said members for engagement with said crank case in the event of a back-fire during the starting operation, for preventing damage to the parts.

Signed at Los Angeles, Los Angeles county, California, this 6th day of May, 1918.

EDWARD P. SOMMERS.

In presence of—
 LUTHER L. MACK,
 H. M. BRUNDAGE.